United States Patent [19]

Allen

[11] Patent Number: 4,994,907
[45] Date of Patent: Feb. 19, 1991

[54] COLOR SENSING CCD WITH STAGGERED PHOTOSITES

[75] Inventor: James D. Allen, Rochester, N.Y.

[73] Assignee: Eastman Kodak Company, Rochester, N.Y.

[21] Appl. No.: 399,105

[22] Filed: Aug. 28, 1989

[51] Int. Cl.⁵ ............................................. H04N 27/02
[52] U.S. Cl. ....................................... 358/41; 358/44; 358/75; 358/212; 358/213.11
[58] Field of Search ................ 358/41, 44, 75, 213.11, 358/213.27, 213.28, 212.29, 213.13, 55, 213.26, 212; 250/208.1

[56] References Cited

U.S. PATENT DOCUMENTS

| | | | |
|---|---|---|---|
| 4,200,892 | 4/1980 | Weimer | 358/213 |
| 4,204,230 | 5/1980 | Sprague | 358/212 |
| 4,438,457 | 3/1984 | Tandon et al. | 358/213.26 |
| 4,558,365 | 12/1985 | Ochi | 358/212 |
| 4,602,289 | 7/1986 | Sekine | 250/208.1 |
| 4,675,535 | 6/1987 | Tsunekawa et al. | 250/208.1 |
| 4,707,615 | 11/1987 | Hosaka | 250/578 |
| 4,763,189 | 8/1988 | Komatsu et al. | 358/75 |
| 4,870,483 | 9/1989 | Nishigaki et al. | 358/55 |

*Primary Examiner*—Howard W. Britton
*Assistant Examiner*—Michael H. Lee
*Attorney, Agent, or Firm*—Norman Rushefsky

[57] ABSTRACT

A line sensor with photosites accurately located for color scanning. The sensor includes a plurality of photosites arranged in a two-dimensional, staggered pattern which is repeated across the length of the sensor. Only one photosite is located for every direction perpendicular to the axis of the line image. Individual color filters extend over all the photosites located at the same perpendicular distance from the line image axis. In one embodiment, the filters are disposed on separate transparent members which are aligned and assembled over the photosites.

12 Claims, 3 Drawing Sheets

COLOR SENSING CCD WITH STAGGERED PHOTOSITES

BACKGROUND OF THE INVENTION

1. Field of the Invention

This invention relates, in general, to apparatus for scanning lines of original documents and, more specifically, to charge coupled devices suitable for color scanning.

2. Description of the Prior Art

Document scanners are used with the various types of equipment to obtain image data from an original document or picture. These scanners use electronic elements to convert the light signals into electrical signals suitable for storage in a solid state memory. Charge coupled devices (CCD's) are frequently used as the basic optical sensor element in such scanners. The CCD is supplemented by additional electronic circuits to control and synchronize the CCD data with the scanned document.

In order to use scanners in applications where the color of the scanned document is to be detected or recognized, special sensors must be used to provide the color information. While exposing the document with different color light and using a conventional monochromatic CCD does provide the information needed, the preferred arrangement is to expose the document with white light and filter the color components received by the sensor. Such filtering is conventionally provided by colored filters positioned directly over the photosensitive sites of the sensor device. In some applications, however, diffraction of the imaged light is used to position different color components at different locations and sense them independently with separate photosensitive sites or with the same site displaced in location by the movement of the scanning device during operation. Even other forms of color sensing have been used according to the prior art. Regardless of which method of sensing color images is used, the data from the sensor or CCD must be able to distinguish relative amounts of light energy for different color components of the image from the document.

When image light directed to a CCD sensor is filtered before impinging upon the photosensitive sites, or photosites, the filters are usually placed over specific photosites by use of a mask during construction. The mask restricts the application of the filters to only those photosites which are to be covered with that color filter. Since CCD's often have several thousand photosites and three color filters are usually used, the process of masking off parts of the CCD for each color filter is rather tedious and is susceptible to error and defects. This causes the yield of acceptably filtered CCD's to be lower than desirable. When something in the masking process goes wrong or otherwise does not turn out as desired, the complete operation must be performed over again, possibly at the loss of a complete CCD sensor.

Gelatin filters are frequently used according to the prior art and are reasonably easy to apply. However, gelatin filters have a very wide bandwidth and are not suitable for many applications. Another process which does produce suitable bandwidth for many applications is known as metal deposition of interference filters. This process requires masking for each color, and each color may be made of 20 or 30 different depositions. Thus, the yield is potentially poor with metal deposition of filters onto CCD's. Therefore, it is desirable and it is an object of this invention to provide a filter arrangement for light sensors which is easy to apply and which facilitates high yields of acceptably filtered CCD's.

CCD's are available as both area sensors and as line sensors. Area sensors are capable of sensing a two-dimensional image without relative movement between the sensor and the original document. Line sensors are only able to scan entire two-dimensional documents by moving the lens sensor and document relative to one another. Line sensors which are used for monochromatic image sensing have a single row of photosites which correspond in number to the pixel resolution of the sensed image data. To maintain the same pixel resolution, a color sensor with filters would need three such line sensors arranged in parallel with separate color filters.

U.S. Pat. No. 4,763,189, issued on Aug. 9, 1988, illustrates a color sensor constructed according to the prior art. That patent pertains to a method of constructing the three parallel line sensors and their respective color filters in such a manner that the interconnections between the sensor arrays and the output circuitry can be made easier, consistent with high resolution and speed. However, in many applications, the resolution provided by three line sensors in parallel is not required. This requires that every third or fourth photosite in the same line of sensors have the same color filter, and this can be provided with the prior art teachings which mask the photosites for different colors. This may lower the pixel resolution, but line sensors of very high resolution are available to compensate for the resolution decrease with such a filter system. When the resolution provided by a single line color sensor (no overlapping of the photosites as the lines are scanned) is sufficient, the present invention provides a unique way to position the filters over the photosites.

SUMMARY OF THE INVENTION

There is disclosed herein a new and useful line sensor suitable for :color scanning a line image. The line sensor consists of a plurality of photosites arranged on the face of the line sensor in a staggered pattern which repeats across the length of the line sensor. The staggered pattern contains only one photosite for each and every perpendicular distance from the longitudinal axis of the line image. Color filters are disposed over the individual photosites, with all of the photosites at the same perpendicular distance from the line image axis being aligned under the same color filter. The color filters are aligned across the line sensor with their axes all in parallel.

In one embodiment of the invention, the color filters are disposed directly upon the face of the line sensor structure. In another embodiment of the invention, each color filter is disposed upon a separate transparent member and the transparent members are combined and positioned over the photosites in the line sensor. In a third embodiment of the invention, all of the color filters are disposed on the same transparent member which is aligned over the photosites.

The staggered arrangement of the photosites on the line sensor allows for a simpler configuration of the color filters needed to filter the light impinging upon the line sensor. According to the invention, the line color filters do not require masking of individual, non-adjacent pixels when placing the filters on the line sensor. In addition, the color filters are in the shape of long, slender, line filters and can be constructed with higher production yields on separate members. When the members are separate from the line sensor itself, the production yield of a line sensor-filter combination is substantially increased over prior art techniques.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
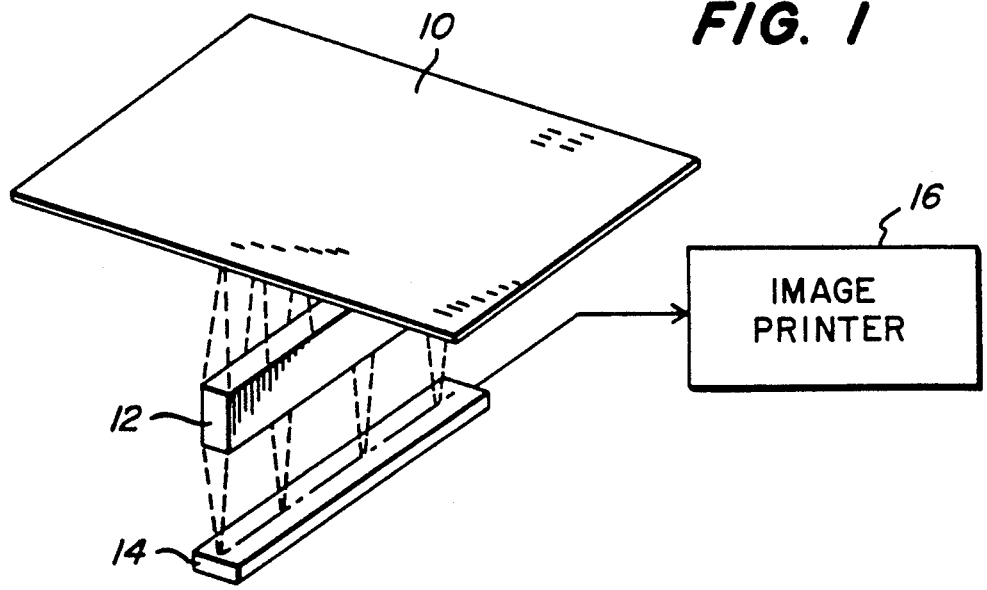
FIG. 1 is a diagram illustrating generally an application using the invention.

Throughout the following description, similar reference characters refer to similar elements or members in all oF the figures of the drawings.

Referring now to the drawings, and to FIG. 1 in particular, there is functionally shown a basic copying machine using the invention. The original document 10 to be copied is illuminated by light, and a line image of the information on the underside of the document 10 is focused by the lens 12 upon the line sensor 14. The entire Page is scanned, line by line, by relative movement of the document 10 with respect to the line sensor 14. The image data collected by the line sensor 14 is conveyed to the image printer 16 which produces the copy on the output medium by a suitable process, such as electrophotography. In order for the line sensor 14 to provide color image information to the image printer 16, the sensor 14 must be suitably constructed to distinguish between the color components contained in the image on document 10.

Figure 2:
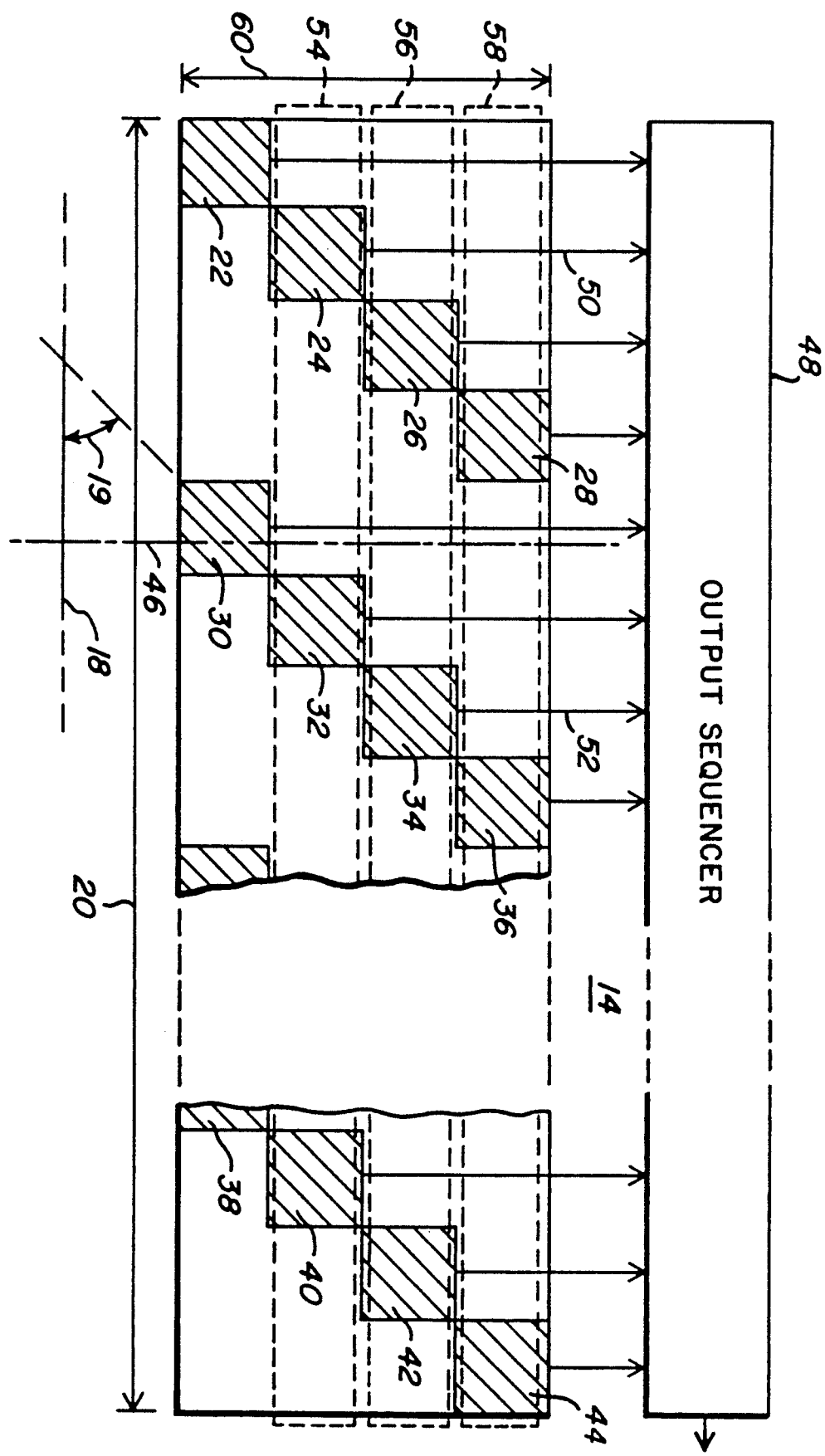
FIG. 2 is a schematic diagram of a CCD constructed according to one embodiment of the invention.

FIG. 2 is a schematic representation of a color line sensor constructed according to one embodiment of the invention. The line sensor 14 is a solid state CCD (charge coupled device) with photosensitive sites, or photosites, arranged on the top surface of the sensor. FIG. 2 illustrates the top or face of the sensor which is the area upon which the line image would be focused. The axis or direction of the scanned line is parallel to the line axis 18. Although only a limited number of photosites are shown in FIG. 2, it is to be understood that the line sensor can have a large number of photosites across the whole length of the scanned line, which is along the dimension 20 shown in FIG. 2.

Repeating patterns of photosites are disposed across the top face of the sensor. Photosites 22, 24, 26 and 28 provide one staggered pattern or subarray, while photosites 30, 32, 34 and 36 provide the next staggered or rePeating pattern of photosites. The last staggered or rePeating pattern in the sensor 14 is provided by photosites 38, 40, 42 and 44. The staggered arrangement of these photosites provides for only one color photosite at the same position along the line axis 18. Line axis 18 represents the direction of the predominant longitudinal axis of the scanned line image. The actual image is scanned across the face of the sensor. In addition, only one photosite occupies an area at any position along the same direction perpendicular to the line axis 18. In other words, the axis or direction 46 intersects only the photosite 30 since all of the other photosites are staggered and displaced from the axis 46. The angle 19 of the photosites in the repeating patterns with respect to the line axis 18 depends on the exact size and spacing of the photosites. The arrangement shown in FIG. 2 with equally spaced square photosites dictates an angle 19 of 45°. Providing this orientation of the photosites on the solid state CCD element is a matter of properly masking the CCD during construction and is well within the ability of those knowledgeable of state of the art CCD construction and manufacture.

The output sequencer 48 shown in FIG. 2 generally represents the additional circuitry on the CCD for accumulating the charges on the specific photosites and outputting electrical information to other electronic circuitry in the proper order. Electrical connections between the photosites and the sequencer 48 are represented by lines therebetween, such as lines 50 and 52. Since the photosites are at different positions in the CCD, they will, in effect, sense different lines in the image. In order to synchronize the outputs of the photosites so that the output would represent the same image line, the output sequencer 48 could contain delay circuitry which delays the signal output from a specific photosite until it is synchronized with the output from another photosite at a different perpendicular distance from the line axis 18. With the four-photosite, staggered arrangement shown in FIG. 2, three of the four photosites would need delay circuits to synchronize their outputs with the fourth photosite in the repeating pattern. Instead of dedicated delay circuitry on the CCD chip, it is also possible to process the data from the line sensor 14 in external circuitry, such as a microprocessor, and rearrange the data appropriately to combine data which Provides for all of the photosites along a single line image.

The pixel resolution of the scanned line image is dependent upon the number of photosites occurring in the line sensor along dimension 20. For purposes of illustration, the line sensor 14 could be a contact array which is 12 inches long and which includes 4,800 photosites along this dimension to provide an overall pixel resolution of 400 pixels per inch. Since each pixel in a repeating pattern senses a different color component, as will be described in more detail later, the color pixel resolution is less than the total pixel resolution and, in this example, is 100 pixels per inch.

The staggered arrangement of the photosites provides for a convenient placement of color filters over the photosites. In FIG. 2, colored filters 54, 56 and 58 are placed at different positions along dimension 60 of the line sensor 14 and extend the entire length of the sensor along dimension 20. Thus, in effect, only three color filters are needed to provide the filtering of light to the photosites for all the photosites in the line sensor, because of the unique staggered arrangement of the photosites. For example, the color filter 56 filters light hitting all of the photosites at the same PerPendicular distance from the axis of the image line 18, such as photosites 26, 34 and 42. These filters are much longer than their width, with their longitudinal axes (not illustrated) being parallel to each other and to the line axis 18. Although shown as continuous filters for the entire length of the sensor, the filters may be linear arrays of spaced filters with gaps between the individual pixel filters when the pixels are spaced from each other.

The use of the three color filters provides a means for separating the line image light into the three color components needed to adequately define the color in the image. Thus, filter 54 would be a red filter, filter 56 would be a blue filter, and filter 58 would be a green filter. The fourth set of photosites, such as photosites 22, 30 and 38, are not filtered by a color filter. These Photosites can be used to sense the line image when distinction between the colors is not desired or necessary, such as when the original document being scanned is a monochromatic, or black and white, document. Or, with a special filter, they can be used to detect a special color. It is emphasized that the invention may or may not include a separate set of photosites which are not covered by any color filter, and that a different number, color, or relative position of color filters may be used within the contemPlation of the invention.

Figure 3:
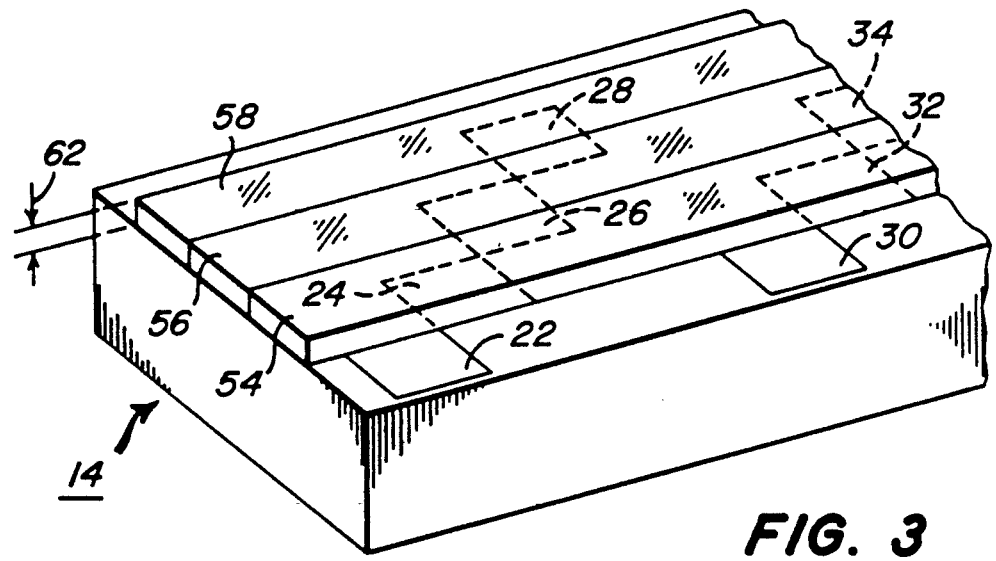
FIG. 3 is a partial isometric view of a CCD constructed according to the embodiment shown in FIG. 2.

FIG. 3 is a partial isometric view of a CCD constructed according to the embodiment shown in FIG. 2. The color filters 54, 56 and 58 are deposited over the photosites (24, 26, 28, 32 and 34) by a method known as metal deposition of interference filters, which is well known to those skilled in the art. The amount of masking required during the filter deposition operation is much less intricate and complicated than masking according to the prior art in which individual photosites in the same line needed to be masked. In this embodiment, only three individual Filters are needed, and these can be deposited directly upon the photosites. The thickness 62 of the filters is exaggerated in FIG. 3 for clarity purposes. Normally, the thickness of such filters is very small compared to the substrate or package which contains the photosites. The width or distance across each photosite is also small, being on the order of 60 microns.

Figure 4:
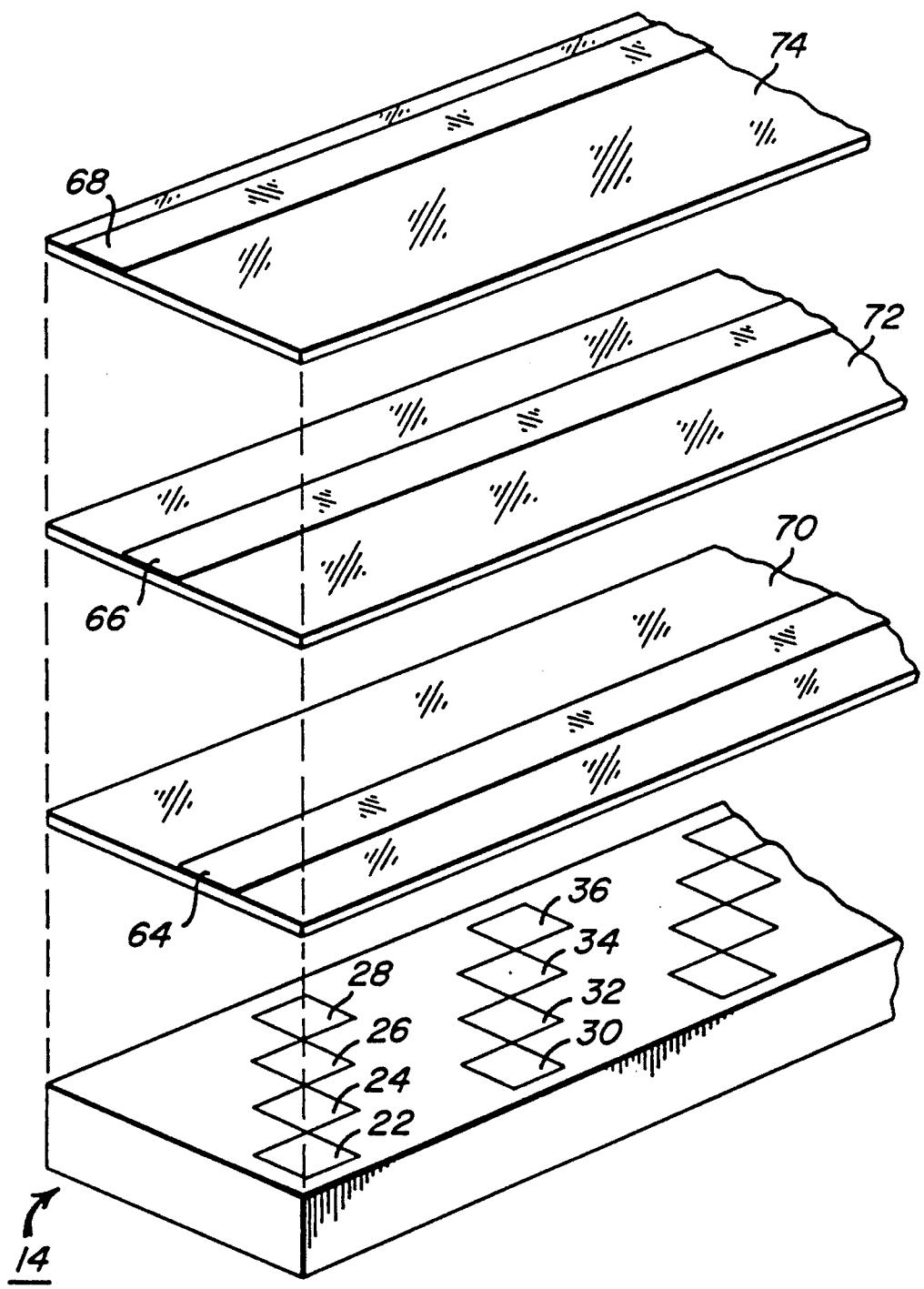
FIG. 4 is an exploded view of a CCD constructed according to another embodiment of the invention.

FIG. 4 shows another embodiment of the invention wherein the filters are disposed over the photosensitive sites in another manner. According to FIG. 4, the filters 64, 66 and 68 are separately deposited upon transparent members 70, 72 and 74, respectively. These members are then stacked on top of the line sensor 14 with the filters on the transparent members aligned over different photosites. The final result is still in accordance with FIG. 2. This arrangement of construction allows even a higher yield in properly constructed line sensors, since a defective filter can be discarded in place of an acceptable filter before being combined with the other filters for placement over the line sensor 14. Here again, the filters 64, 66 and 68 can be formed on the transparent members by the metal deposition technique.

Figure 5:
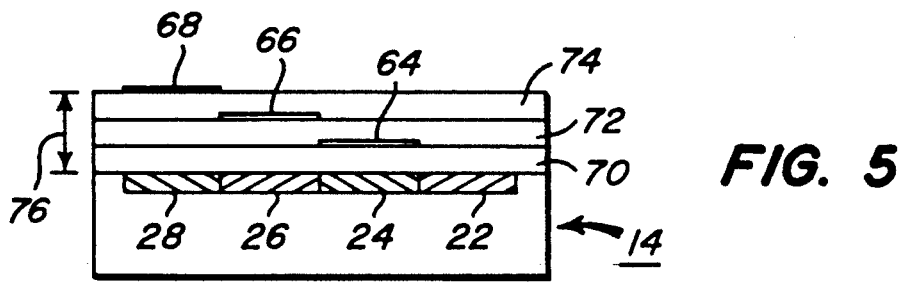
FIG. 5 is a cross-sectional view of a CCD constructed according to the embodiment shown in FIG. 4.

FIG. 5 is a cross-sectional view of the CCD shown in FIG. 4 after the filters have been assembled on top of the line sensor 14. As can be seen in FIG. 5, the filter 68 is aligned over the photosite 28, the filter 66 is aligned over the photosite 26, and the filter 64 is aligned over the photosite 24. Photosite 22 is aligned for unfiltered light from the line image. The dimension 76, which represents the height of the combined filter arrangement, is shown in exaggerated proportions for clarity of the drawing. In actual practice, the transparent members 70, 72 and 74 would be relatively thin compared to the overall line sensor structure. A suitable adhesive, or other bonding technique, can be used to fasten the transparent members together and to the sensor 14.

Figure 6:
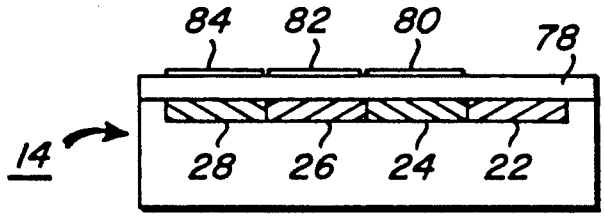
FIG. 6 is a cross-sectional view of a CCD constructed according to still another embodiment of the invention.

FIG. 6 illustrates an arrangement for constructing the filters according to another embodiment of the invention. In this embodiment, the color filters are constructed or deposited upon a common transparent member 78. The color filters are aligned with filters 80, 82 and 84 respectively over photosites 24, 26 and 28. This type of construction allows the three color filters to be constructed or deposited upon the supPorting transparent member before they are placed over the line sensor 14. Thus, any defects in the color filters occurring during their formation or deposition only involve the yield of the filter arrangement, since the filter has not yet been applied to the line sensor. Thus, the overall yield of the line sensor with suitable filters attached is enhanced by such a construction technique.

The unique orientation of the photosites in a one-line sensor allows for convenient color filter placement. Production difficulties associated with the previous line sensors are overcome and several variations of filter support arrangements are disclosed. It is emphasized that numerous changes may be made in the above-described apparatus without departing from the teachings of the invention. It is intended that all of the matter contained in the foregoing description, or shown in the accompanying drawings, shall be interpreted as illustrative rather than limiting.

I claim as my invention:

1. A line sensor having an elongated dimension in a direction establishing a predominant line axis of said line sensor, the line sensor being suited for color scanning an image on a document that is moved relative to said sensor in a direction perpendicular to the predominant line axis, said line sensor comprising:
   a staggered array of coplanar photosensitive sites, said array containing only one site along a perpendicular line extended in the plane of the photosensitive sites from the predominant line axis, and said staggered array including identical subarrays repeated a plurality of times along said predominant line axis; and
   a plurality of color filters disposed across the sites, with all of the sites at the same perpendicular distance from the predominant line axis being aligned with a filter of the same color.

2. The line sensor of claim 1 wherein each subarray includes at least three sites each displaced different distances from the line axis for sensing light of a different color.

3. The line sensor of claim 1 wherein each subarray includes first, second, and third sites for individually sensing three distinct separation colors, and a fourth site for sensing the line image without any color separation.

4. The line sensor of claim 1 wherein the color filters are deposited directly on the physical surface of the photosensitive sites.

5. The line sensor of claim 1 wherein the color filters are disposed on transparent members which are arranged over the photosensitive sites.

6. A solid-state line sensor having an elongated dimension in a direction establishing a predominant line axis of said line sensor, said line sensor being suited for color scanning a line image from an original document, said line sensor comprising:
   a plurality of photosites arranged in a two-dimensional array with repeating patterns each oriented at an angle with respect to the predominant line axis;
   means defining data movement circuitry that are connected to said photosites;

first and second longitudinal color filters each disposed as a linear array parallel to the predominant line axis and across corresponding color responsive photosites in the line sensor;

said filters having their longitudinal axes parallel to each other; and said line sensor being void of more than one photosite in any direction perpendicular to the predominant line axis.

7. The line sensor of claim 6 wherein the repeating pattern includes at least three photosites.

8. The line sensor of claim 6 wherein the filters are deposited directly on the physical surface of the photosites.

9. The line sensor of claim 6 wherein the filters are formed by one or more separate surfaces positioned over the photosites.

10. A solid state line sensor having an elongated dimension in a direction establishing a predominant line axis of said line sensor, said line sensor being suited for color scanning a line image from an original document, said line sensor comprising:

a number N of photosites arranged in a two-dimensional array with repeating patterns each oriented at an angle with respect to the predominant line axis;

means defining data movement circuitry that are connected to said photosites;

first and second color filters each disposed as a linear array parallel to the predominant line axis and across corresponding color responsive photosites in the line sensor;

said filters having their longitudinal axes parallel to each other; and said line sensor being void of more than one photosite in any direction perpendicular to the predominant line axis of the line sensor.

11. The line sensor of claim 10 wherein each repeating pattern has M photosites with M being four or less, and wherein N is equal to the color pixel resolution of the line sensor multiplied by M.

12. The line sensor of claim 10 wherein the filters are formed by one or more separate surfaces positioned over the photosites.

* * * * *